United States Patent

Bagley et al.

[11] Patent Number: 5,924,845
[45] Date of Patent: Jul. 20, 1999

[54] CENTRIFUGAL PENDULUM ABSORBER FOR ENGINE BLADES

[75] Inventors: Ronald L. Bagley, Boerne, Tex.; Joseph J. Hollkamp, Fairborn; Robert W. Gordon, Vandalia, both of Ohio

[73] Assignee: The United States of America as represented by the Secretary of the Air Force, Washington, D.C.

[21] Appl. No.: 08/840,109

[22] Filed: Apr. 7, 1997

[51] Int. Cl.$^6$ .............................. F01D 5/16; F01D 5/26
[52] U.S. Cl. .................... 416/145; 416/500; 188/378
[58] Field of Search ................................ 416/145, 500; 188/378, 379

[56] References Cited

U.S. PATENT DOCUMENTS

| | | | |
|---|---|---|---|
| 4,057,363 | 11/1977 | Benigsberg et al. | 416/145 |
| 4,239,455 | 12/1980 | Broekhuizen et al. | 416/145 |
| 4,239,456 | 12/1980 | Joglekar et al. | 416/145 |
| 4,460,314 | 7/1984 | Fuller | 416/145 |
| 4,527,951 | 7/1985 | Trier | 416/145 |
| 4,766,984 | 8/1988 | Gaffey et al. | 188/330 |
| 5,495,924 | 3/1996 | Shaw et al. | 188/378 |

OTHER PUBLICATIONS

K. P. Byme "Pendulum Dynamic Biration (SIC) Absorbers for Reducing Blade Vibration in Idustrial Fans," Vibration of Blades and Bladed Disk Assemblies: Procedings of the ASME Tenth Biennial Conference on Mechanical Vibration and Noise, pp. 89–96, 1985.

Es Tse at al., Mechanical Vibration, pp. 167–197, 1971.

Primary Examiner—Christopher Verdier
Assistant Examiner—Ninh Nguyen
Attorney, Agent, or Firm—Fredric L. Sinder; Thomas L. Kundert

[57] ABSTRACT

A new apparatus and method for dynamically absorbing resonant vibration in jet engine blades and other rotating turbomachine components over all engine speeds is disclosed. A distributed pendulum (a pendulum having its axis of motion inside its body instead of at an end) is mounted inside a jet engine blade to function as a centrifugal pendulum. A centrifugal pendulum can be tuned so that its natural frequency linearly tracks the rotational speed of the engine or other turbomachine in which it is mounted and can absorb resonant vibrations from turbomachine components whenever the frequency of a source of vibratory excitation from a so-called speed line of the turbomachine coincides with a resonant frequency of the component. The equations of motion of a distributed pendulum are derived to show that a distributed pendulum small enough to fit inside a turbomachine component can be tuned to track a turbomachine speed line by adjusting its mass distribution about its axis of motion.

13 Claims, 5 Drawing Sheets

CENTRIFUGAL PENDULUM ABSORBER FOR ENGINE BLADES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to apparatus and methods for absorbing or suppressing vibration in rotating machinery, and more specifically to a centrifugal pendulum absorber for attenuating resonant vibration in jet engine blades over all engine speeds.

Potentially destructive resonant vibration can occur when the frequency of an alternating excitation force imposed on a machine part from the motion of the machine equals a natural, or resonant, frequency of the machine part. A typical machine part will have more than one resonant frequency, representing the various modes, or ways, in which the machine part can vibrate. For example, a jet engine blade attached to the circumference of a jet engine rotor may be viewed as a simple cantilever beam which, as it rotates, experiences various bending forces, such as the aerodynamic forces, or kick, imposed on it each time it rotates past a stator (a stationary blade). As a cantilever beam, it will have resonant frequencies representing various bending modes in which it will simply bend, or whip, back and forth, bend with one wave along its length, bend with two waves along its length, and so forth, with each higher resonant frequency typically being an integer multiple of a first resonant frequency. If excited by an alternating force having an excitation frequency the same as a resonant frequency of the blade, the excitation force will cause increasingly greater blade oscillations in that vibration mode, similar to pushing a playground swing at the natural frequency of the swing. The frequency of the bending forces, or the excitation frequency, imparted on jet engine blades is typically, and logically, an integer multiple of the rotation rate of the jet engine. For example, one usual source of an excitation force is, as previously described, the aerodynamic kick imposed each time a blade passes a stator. This will happen a certain set number of times with each complete rotation. Another excitation force may be from the aerodynamic kick imposed from the interaction with other rotor blades and stators upstream from the blade of interest. This force will also happen a set number of times per rotation, but likely a different set number of times from the first described source. Each of these physical sources of a vibratory excitation will cause a different so-called speed line, which is an integer multiple of engine speed, or rotation rate. As first described by W. Campbell in a pioneering 1924 work describing the problems of vibration in turbomachinery, this can be described in a Campbell diagram, where speed lines are plotted on a graph against the various frequencies at which resonant vibration will occur for each vibration mode of the machine part in question. Wherever a speed line, corresponding to a particular aspect of turbomachine structure which causes a regularly occurring vibratory excitation, crosses a resonant frequency line, resonant vibration is possible. This means that the excitation frequency on jet engine blades from operation of a jet engine will equal or coincide with, in a stepwise manner, successively higher resonant frequencies of the blades as engine speed increases.

Modern jet engine blades are better modeled as plates than as beams, so that they have more complicated vibration modes, including, in addition to conventional bending modes, torsion modes and chordwise bending modes. All these vibration modes combine to determine the actual resonant frequencies for a particular jet engine or other turbine or turbomachine blade.

The prior art for reducing resonant vibration in jet engine blades has primarily concentrated on damping a particular vibration mode or family of modes. This is usually accomplished by adding friction dampers. Unfortunately, friction damping is difficult to characterize and can deteriorate with wear. Other damping research for engine blades has focused on using viscoelastic materials. The major challenges with viscoelastic treatments are the limited availability of materials that can function in an elevated temperature region and the tendency of those materials to creep when subjected to the centrifugal force field created by a rotating turbine. The most successful viscoelastic approach for rotating components has been the application of vitreous enamel coatings with internal three-dimensional metallic containment networks.

The jet engine prior art has also studied vibration absorbers and particle dampers. It has been shown, for example, that a damped cantilevered beam located on the tip of a blade would effectively suppress vibration for a particular vibration mode.

The non-jet engine prior art has also explored the use of centrifugal pendulum absorbers, which are pendulums attached to rotating components (such as a crankshaft for an automotive-type internal combustion engine) to absorb various bending and torsional vibration modes of the crankshaft. If pendulums attached to a crankshaft are configured so that their natural frequency is equal to a resonant frequency of a vibration mode of the crankshaft, whenever the crankshaft undergoes a vibratory excitation of that frequency and would otherwise begin to resonate, the attached, or coupled, pendulums begin to also resonate at the same frequency and will absorb, not merely damp by friction, the resonant vibrations of the crankshaft. In other words, the resonant vibrations now take place by more harmless interactions between the crankshaft and pendulums, and not by harmful movements of the crankshaft against its bearings and housing. The non-jet engine prior art has extended this use of centrifugal pendulums by recognizing that the centrifugal force field created by a rotating machine component can be used to configure the pendulums so that their resonant frequency changes linearly with engine speed. If done properly, the resonant frequency of the pendulums will always equal the stepwise increasing resonant frequency of a particular vibration mode of the crankshaft whenever the engine speed reaches a point where an aspect of engine design causes a regularly occurring vibratory excitation, i.e., a speed line, to then equal a resonant frequency of the crankshaft. Centrifugal pendulums, therefore, can track a speed line and perform as a so-called dynamic vibration absorber to protect against resonant vibration at all engine speeds. This is a substantial advantage over other vibration attenuation approaches which may protect at only a specific engine speed or for a single vibration mode.

A particular problem in the non-jet engine prior art of centrifugal pendulum absorbers is designing pendulums that will exhibit useful resonant vibration frequencies while not also being too large or too heavy to be practical. Prior art solutions typically involve finding ways to make pendulums of sufficient mass small enough, and not ways to avoid having to use pendulums of large mass.

As previously stated, the jet engine prior art has tried attaching at least pendulum-like structures to blade tips to attenuate vibration. An example of this approach is described in U.S. Pat. No. 4,460,314 to Fuller for a vibration damper. The Fuller patent describes a closed U-shaped chamber inside the tip of a turbine blade. The chamber is partially filled with a liquid that can oscillate from one end of the chamber to the other. The Fuller patent describes equations for determining or selecting the dimensions and other parameters of the damper so that, at a particular frequency and a particular rotation speed, blade vibration will be damped. It also includes a teaching of how those parameters may be varied to produce less damping, but over a greater range of engine speeds. The Fuller patent does not include a teaching of how it might be modified so that it could track a speed line to fully damp blade vibration over all engine speeds.

The Fuller patent describes how its derived equations theoretically indicate that the range of liquid masses and chamber sizes possible in an engine blade can produce practically useful levels of damping. Unfortunately, the severe space and weight limitations for jet engine components are a substantial barrier to successful means for attenuating blade vibration. The problem is even greater for dynamic vibration absorption.

Thus it is seen that there is a need for a successful method and apparatus for attenuating vibration in jet engine blades over all engine speeds, and in particular, a need for a successful adaptation of the teachings of centrifugal pendulums to jet engine blades and other turbomachine components.

It is, therefore, a principal object of the present invention to provide a successful centrifugal pendulum vibration absorber for jet engine blades that works within the space, mass and environmental limitations of a jet engine or other turbomachine.

It is a feature of the present invention that its use of a distributed pendulum instead of a pendulum having its axis of motion at an end allows use of a smaller and lighter pendulum making practical the use of a centrifugal pendulum for a jet engine blade.

It is another feature of the present invention that its damped embodiment is very tolerant to mistuning.

It is an advantage of the present invention that it will absorb vibrations from a hot jet engine blade as well as from a cool jet engine blade.

These and other objects, features and advantages of the present invention will become apparent as the description of certain representative embodiments proceeds.

SUMMARY OF THE INVENTION

In accordance with the foregoing principles and objects of the present invention, a novel system for dynamically absorbing resonant vibration in jet engine blades over all engine speeds is described. The unique discovery of the present invention is, first, the application of a centrifugal pendulum to the problem of resonant vibration in jet engine blades and, second, that a centrifugal pendulum can be made that both meets the environmental constraints for jet engine blades and can effectively absorb resonant blade vibration along a speed line by using a distributed pendulum (a pendulum having its axis of motion inside its body instead of at an end) mounted inside an engine blade and varying the mass distribution of the distributed pendulum about its axis of motion to tune the natural frequency of the distributed pendulum along a speed line.

Accordingly, the present invention is directed to a method for dynamically absorbing resonant vibration of a rotating component of a turbomachine over a range of turbomachine rotation rates, comprising the steps of providing a distributed pendulum for attaching to the rotating component inside the rotating component, the distributed pendulum having a mass distributed about an axis of motion, and preselecting the mass distribution of the distributed pendulum such that the natural frequency of the distributed pendulum, when attached inside the rotating component, will track a preselected speed line of the turbomachine. The distributed pendulum may also be attached to the inside of the rotating component. The distributed pendulum may further be a plate having an area distribution about the axis of motion and the area distribution of the distributed pendulum preselected such that the natural frequency of the distributed pendulum, when attached inside the rotating component, will track a preselected speed line of the turbomachine. The distributed pendulum may still further be a plate having first and second moments of area and the ratio of the first and second moments of area of the distributed pendulum preselected such that the natural frequency of the distributed pendulum, when attached inside the rotating component, will track a preselected speed line of the turbomachine. The distributed pendulum may yet further have a shape which is preselected such that the natural frequency of the distributed pendulum, when attached inside the rotating component, will track a preselected speed line of the turbomachine. The distributed pendulum may still also have a varying thickness distribution and the thickness distribution be preselected such that the natural frequency of the distributed pendulum, when attached inside the rotating component, will track a preselected speed line of the turbomachine. The invention may further comprise the step of providing damping for the distributed pendulum.

The present invention is also directed to a centrifugal pendulum absorber for dynamically absorbing resonant vibration of a rotating component of a turbomachine over a range of turbomachine rotation rates, comprising a distributed pendulum attached to the rotating component inside the rotating component, the distributed pendulum having a mass distributed about an axis of motion, wherein the mass distribution of the distributed pendulum is such that the natural frequency of the distributed pendulum will track a preselected speed line of the turbomachine. The distributed pendulum may be a plate having an area distribution about the axis of motion and wherein the area distribution of the distributed pendulum is such that the natural frequency of the distributed pendulum will track a preselected speed line of the turbomachine. The distributed pendulum may also be a plate having first and second moments of area and wherein the ratio of the first and second moments of area is such that the natural frequency of the distributed pendulum will track a preselected speed line of the turbomachine. The distributed pendulum may further be have a shape such that the natural frequency of the distributed pendulum will track a preselected speed line of the turbomachine. The distributed pendulum may still further have a varying thickness distribution such that the natural frequency of the distributed pendulum will track a preselected speed line of the turbomachine. The centrifugal pendulum absorber may further comprise damping on the distributed pendulum.

BRIEF DESCRIPTION OF THE DRAWINGS

The present invention will be more clearly understood from a reading of the following detailed description in conjunction with the accompanying drawings wherein.

DETAILED DESCRIPTION

An analysis of a pendulum absorber for a rotating, vibrating blade according to the teachings of the present invention is complicated. The derivation is presented in a series of steps. First the effects of an undamped pendulum on a single-degree-of-freedom system will be derived. This is a simple problem which demonstrates the basis of the overall problem. Next, the effects of centrifugal loading on pendulum resonant frequencies will be derived. Finally a general formulation with a damped pendulum applied to a damped resonance will be presented. This formulation allows the effects of mistuning to be investigated.

Figure 1:
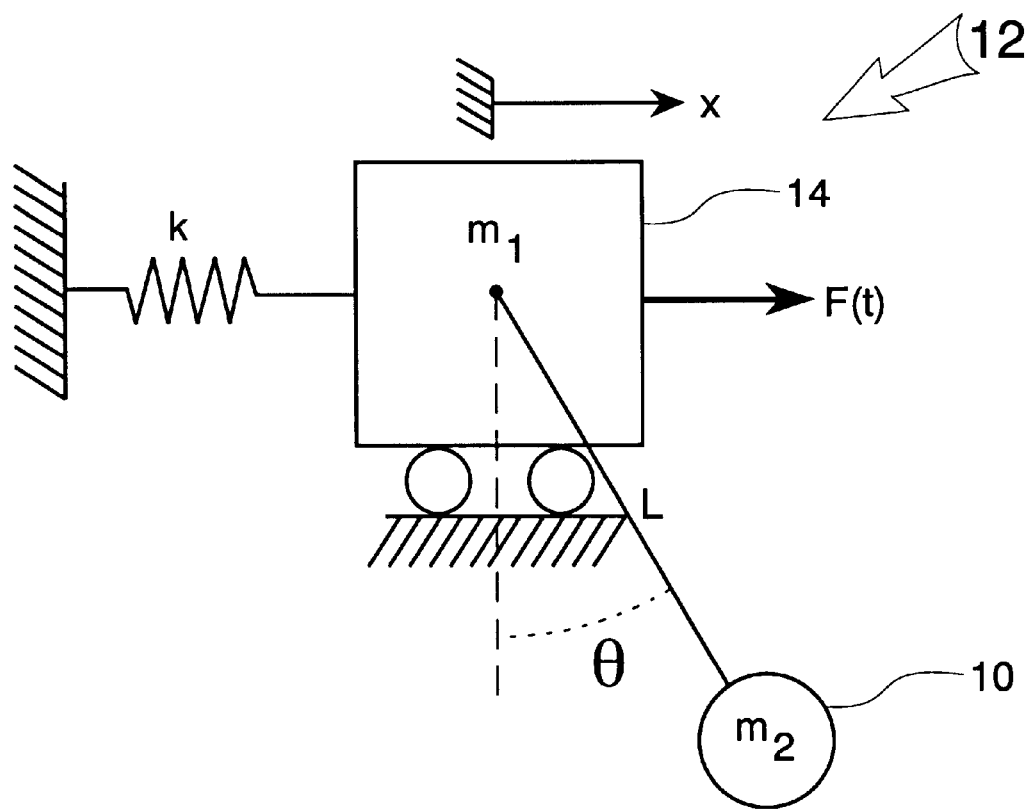
FIG. 1 is a diagram of a simple spring-mass system representing a blade vibration mode with an undamped pendulum absorber attached to the mass.

FIG. 1 shows a pendulum 10 attached to a spring-mass system 12. Spring-mass system 12 represents a vibration mode of an engine blade 14. The mass of blade 14 is represented by $m_1$, and the mass of pendulum 10 is represented by $m_2$. The blade mass is excited by an harmonic force $F(t)$ which varies linearly with blade rotation rate. Without the pendulum absorber, the mass would resonate when the engine produces a harmonic force at the natural frequency of the spring-mass system.

The effects of the pendulum absorber are determined by analyzing the equations of motion, which are $$(m_1+m_2)\ddot{x}+m_2L[\$]\$"g\ddot{v} \cos \theta+kx-m_2L\dot{\theta}^2 \sin \theta=F(t) \quad (1)$$

$$\ddot{x} \cos \theta+L[\$]\$"g\ddot{v}+g \sin \theta-\dot{x}\dot{\theta} \sin \theta=0 \quad (2)$$

These are linearized and Fourier transformed to produce $$\begin{bmatrix} -(m_1+m_2)\omega^2+k & -m_2L\omega^2 \\ -\omega^2/L & -\omega^2+g/L \end{bmatrix} \begin{Bmatrix} X(j\omega) \\ \theta(j\omega) \end{Bmatrix} = \begin{Bmatrix} F(j\omega) \\ 0 \end{Bmatrix} \quad (3)$$

The resulting transfer function between the blade mass displacement and the forcing function is $$\frac{X}{(F/m_1)} = \frac{\omega_p^2-\omega^2}{[\omega_b^2-(1+\beta)\omega^2](\omega_p^2-\omega^2)-\beta\omega^4} \quad (4)$$

where $$\omega_b^2 = k/m_1 \quad (5)$$
$$\omega_p^2 = g/L$$
$$\beta = m_2/m_1$$

The natural frequency of the spring-mass system (representing the blade) when disconnected from the pendulum is $\omega_b$. The natural frequency of the pendulum when disconnected from the mass is $\omega_p$. The mass ratio is defined as $\beta$.

According to equation (4), the vibration of the mass can be canceled if the natural frequency of the pendulum exactly equals the forcing frequency. This is true regardless of the natural frequency of the original spring-mass system. Thus, if the pendulum natural frequency can track along the speed line, the vibrations for all modes excited by a speed line can be canceled. In a normal gravitational field, this is impossible.

Figure 2:
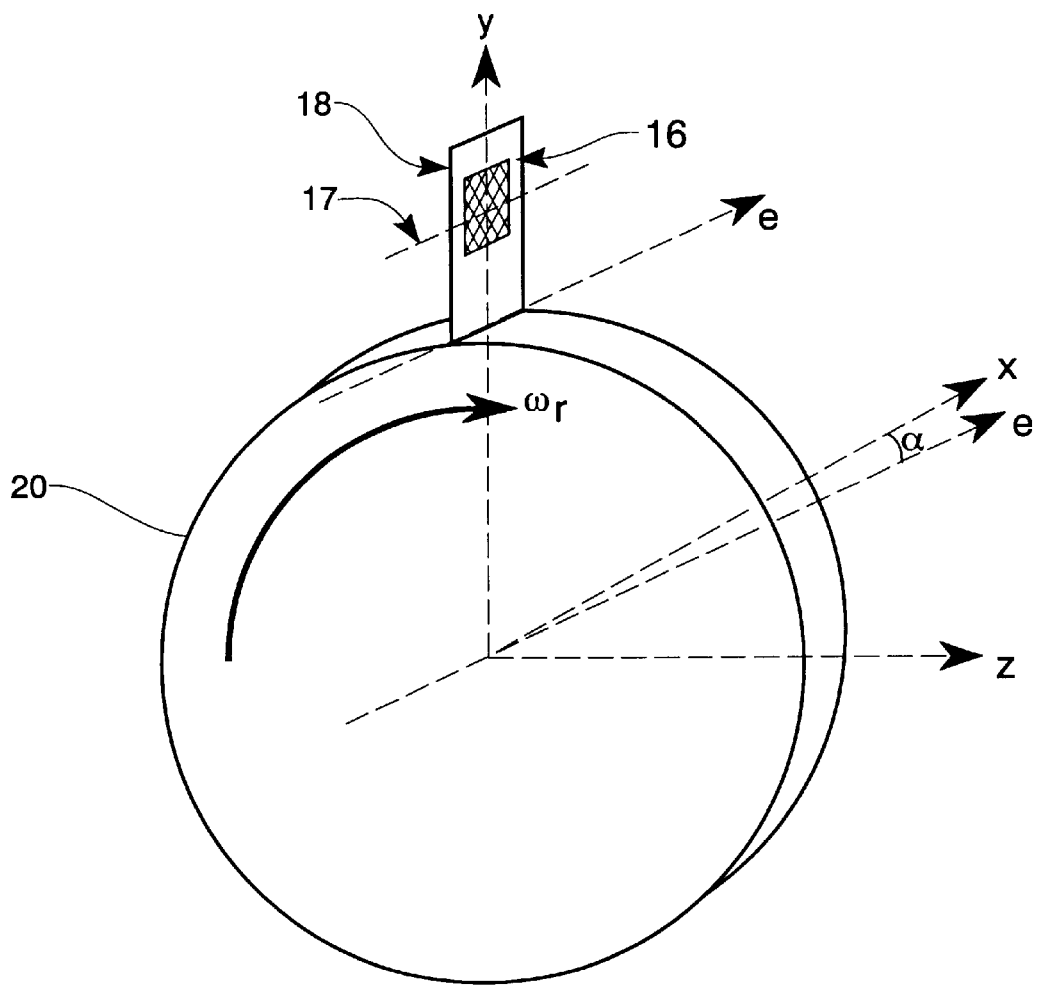
FIG. 2 is a schematic diagram of a pendulum absorber inside an hollow engine blade according to the teachings of the present invention.

FIG. 2 is a schematic diagram of a pendulum absorber inside a hollow engine blade. The natural frequency of the pendulum absorber can track a speed line in a centrifugal force field. The pendulum absorber is represented by a pinned plate 16 located inside a flat hollow blade 18. Pinned plate 16 may rotate about pin axis 17. The blade is rigidly attached to a rotating disk 20. The angle between disk 20's axis of rotation and the plane of blade 18 is defined as α. The natural frequency of pendulum 16 will depend upon the blade angle, α, the rotational speed of the disk, $\omega_r$, and the mass distribution of the pendulum. The expression for the natural frequency will be derived in steps.

Figure 3:
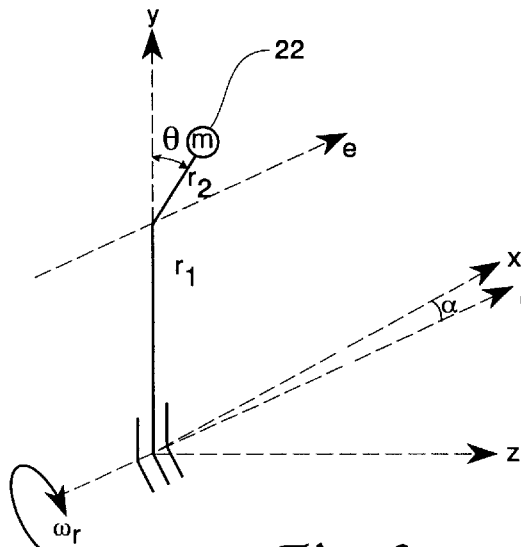
FIG. 3 is a diagram of a simple model of a centrifugal pendulum absorber.

The complicated geometry of the blade-disk-absorber is simplified in FIG. 3. The blade and disk are represented by a rotating link 22. For the moment, the link is assumed to be rigid. The length of the link, $r_1$, is the distance from the disk's axis of rotation to the pendulum axis of rotation. The angle between the axes of rotation is the blade angle α. The pendulum is idealized initially as a point mass. The angle between the blade and the pendulum is θ. The blade and disk are rotating about the x-axis at a radial speed of $\omega_r$. The coordinate system also rotates about the x-axis at this speed (i.e., the y-z plane rotates about the x-axis).

An expression for the kinetic energy of the pendulum is needed to determine the natural frequency of the pendulum. The kinetic energy in terms of the time derivative of the mass position vector r is $$T=1;2m(\dot{r}\cdot\dot{r}) \quad (6)$$

The position vector is $$r=r_1 e_{r1}+r_2 e_{r2} \quad (7)$$

where $e_{r1}$ and $e_{r2}$ are unit vectors defining the orientation of the two links. These unit vectors are $$e_{r1}=j \quad (8)$$

$$e_{r2}=\cos \theta j+\sin \theta(\cos \alpha k-\sin \alpha i) \quad (9)$$

where i, j, and k are unit vectors in the x, y, and z directions. The time derivative of the position vector is $$\dot{r}=r_1 \dot{e}_{r1}+r_2 \dot{e}_{r2} \quad (10)$$

which in terms of cross products is $$\dot{r}=r_1\{\omega_r i X e_{r1}\}+r_2\{[\omega_r i+\dot{\theta}(\cos \alpha i+\sin \alpha k)]X e_{r2}\} \quad (11)$$

After simplification, the kinetic energy becomes $$T=\tfrac{1}{2}m [\omega_r^2(r_1+r_2 \cos \theta)^2+r_2^2\dot{\theta}^2+\omega_r^2 r_2^2 \sin^2\theta \cos^2\alpha+2\omega_r\dot{\theta} \cos \alpha(r_2^2+r_1 r_2 \cos \theta)] \quad (12)$$

There is no potential energy, since gravity is negligible compared to the centrifugal loading. Lagrange's equations of motion are used to generate the equations of motion, which after linearization is $$\ddot{\theta} + \omega_r^2 \left( \sin^2 \alpha + \frac{r_1}{r_2} \right) \theta = 0 \tag{13}$$

The natural frequency of the pendulum is easily extracted from the equations of motion as $$\omega_p = \omega_r \sqrt{\sin^2 \alpha + \frac{r_1}{r_2}} \tag{14}$$

To make the pendulum track, the radical of equation (14) should be equated to the order of the speed line. If the blade angle is set, there are two adjustable variables. The range of one parameter, the distance $r_1$, is limited by the disk radius and the blade length. The range of the other, the pendulum arm length, $r_2$, is limited by the available space inside the blade. Fortunately, the pendulum mass can be distributed to provide some design relief.

Figure 4:
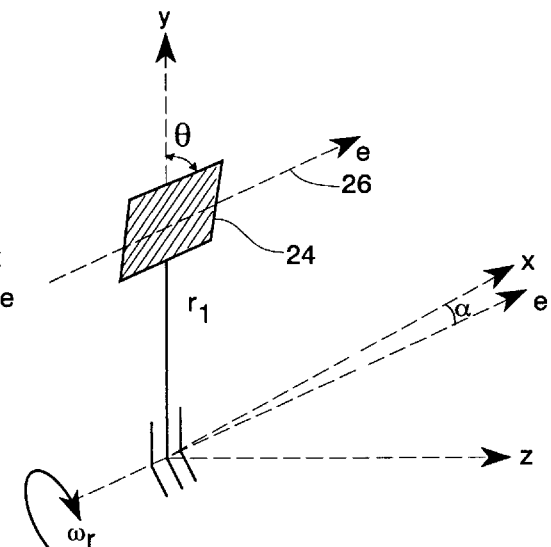
FIG. 4 is a diagram of a simple model of a distributed centrifugal pendulum absorber according to the teachings of the present invention.

The simplified geometry for the distributed pendulum is shown in FIG. 4. The pendulum is represented by a plate 24 rotating about an axis of rotation, or motion, 26. The plate has constant thickness and a constant width. The plate length above the rotation axis is $L_2$ and the length below the axis is $L_1$. The kinetic energy term for the distributed pendulum is $$T = 1/2 \rho A \int_{L_1}^{L_2} \left[ \omega_r^2 (r_1 + r_2 \cos\theta)^2 + r_2^2 \dot{\theta}^2 + \omega_r^2 r_2^2 \sin^2\theta \cos^2\alpha + 2\omega_r \dot{\theta} \cos\alpha (r_2^2 + r_1 r_2 \cos\theta) \right] dr_2 \tag{15}$$

where A is the cross-sectional area and $\rho$ is the mass density of the pendulum plate. After integrating, applying Lagrange's equations of motion, and linearization, the natural frequency of the distributed pendulum is found to be $$\omega_p = \omega_r \sqrt{\sin^2 \alpha + r_1 \frac{I_1}{I_2}} \tag{16}$$

where $I_1$ and $I_2$ are the first and second moments of area $$I_1 = \int_{L_1}^{L_2} r_2 dr_2 = 1/2(L_2^2 - L_1^2) \tag{17}$$

$$I_2 = \int_{L_1}^{L_2} r_2^2 dr_2 = 1/3(L_2^3 + L_1^3) \tag{18}$$

From this derivation, it is seen that the area distribution of the pendulum can be adjusted to track a particular speed line. The shape and thickness of the pendulum can also be varied. The expression for the natural frequency for this case is not provided here, but can be derived by generalizing equation (15).

Figure 5A:
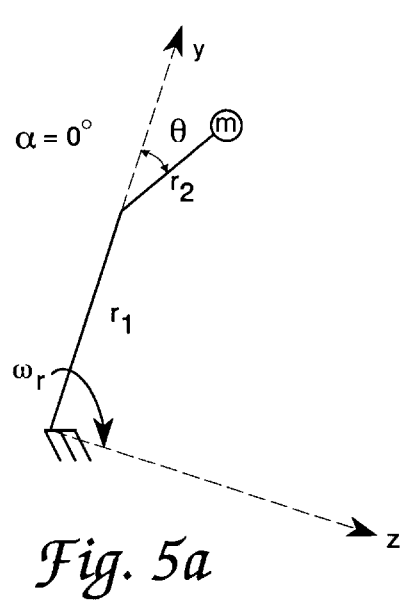
FIGS. 5a and 5b are diagrams of centrifugal absorber models for two special cases.
Figure 5B:
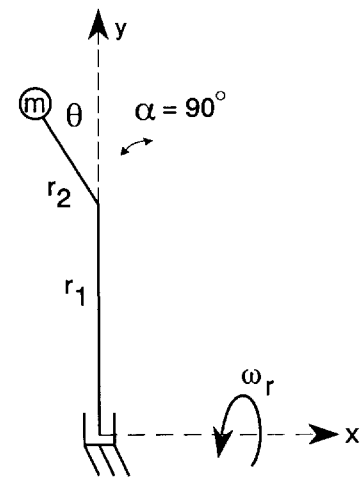

There are two special cases of the centrifugal pendulum absorber when $\alpha$ is 0° or 90°. FIGS. 5a and 5b show the simplified geometry for these cases. When $\alpha$ is 0°, the pendulum oscillates in plane with the disk-blade rotation. This geometry is identical to the centrifugal pendulum absorber used for torsion vibration in shafts. When the blade angle $\alpha$ is 90°, the pendulum oscillates entirely out of the rotational plane. This geometry is identical to the centrifugal pendulum absorbers for linear motion. Again, the pendulum for each case can be distributed.

The undamped pendulum absorber cancels response due to a harmonic force if the absorber is exactly tuned to the excitation frequency. That is, if the pendulum can be distributed properly and the excitation is purely harmonic. However there will be limits in the precision of the pendulum. The excitation may not be purely harmonic, perhaps being narrow banded. A damped absorber is more robust for these cases. The engineering tradeoff is that the vibration will be attenuated rather than canceled. However, an added benefit is that the pendulum itself will be damped and less prone to fatigue. The transfer function for a damped absorber will be derived. Damping in the blade will also be added to analysis.

Figure 6:
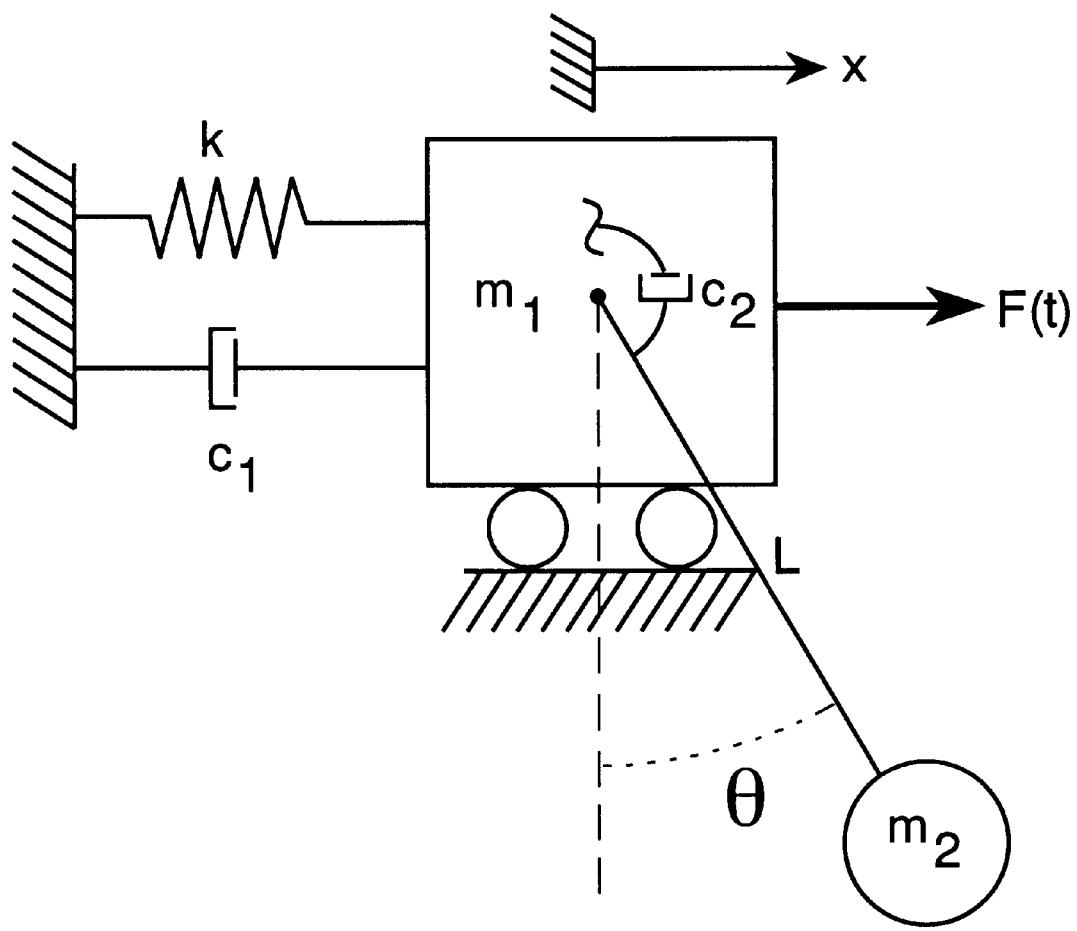
FIG. 6 is a diagram of a damped spring-mass system representing a damped blade vibration mode with a damped pendulum absorber attached to the mass; and, FIG. 7 is a graph showing the reduction in decibels provided by a damped centrifugal absorber over a baseline system for various tuning ratios and pendulum damping ratios.

FIG. 6 shows the configuration for a damped absorber. The linearized, Fourier transformed equations of motion are $$\begin{bmatrix} k - (m_1 + m_2)\omega^2 + j\omega c_1 & -m_2 L \omega^2 \\ -\omega^2/L & \omega_p^2 - \omega^2 + j\omega c_2/m_2 \end{bmatrix} \begin{Bmatrix} X(j\omega) \\ \theta(j\omega) \end{Bmatrix} = \begin{Bmatrix} F(j\omega) \\ 0 \end{Bmatrix} \tag{19}$$

In these equations $\omega_p$ is the natural frequency of the pendulum in a centrifugal field. Here, for simplicity, the inherent damping of the blade represented by the viscous damper $c_1$. The equations are also simplified by using the definitions of the mass ratio and the original spring-mass resonance $$\begin{bmatrix} \omega_b^2 - (1+\beta)\omega^2 + j2\zeta_b \omega_b \omega & -\beta L \omega^2 \\ -\omega^2/L & \omega_p^2 - \omega^2 + j2\zeta_p \omega_p \omega \end{bmatrix} \begin{Bmatrix} X(j\omega) \\ \theta(j\omega) \end{Bmatrix} = \begin{Bmatrix} F(j\omega)/m_1 \\ 0 \end{Bmatrix} \tag{20}$$

where $$c_1/m_1 = 2\zeta_b \omega_b \tag{21}$$
$$c_2/m_2 = 2\zeta_p \omega_b$$

The pendulum's damping ratio, $\zeta_p$, is referenced to a fixed frequency, $\omega_b$, and not to the variable pendulum frequency.

As the pendulum frequency tracks along the engine speed line, there may be some precision error signified by a multiplicative factor $$\omega_p = h\omega) \tag{22}$$

where h is a number near one, which will be referred to as the tuning ratio. Normally the tuning ratio refers to the ratio between the absorber frequency and the system frequency. Here it refers to the ratio between the absorber frequency and the excitation frequency. Substituting equation (22) into the equations of motion produces $$\begin{bmatrix} 1-(1+\beta)\gamma^2 + j2\zeta_b \gamma & -\beta L \gamma^2 \\ -\gamma^2/L & \gamma^2(h^2-1) + j2\zeta_p \gamma \end{bmatrix} \begin{Bmatrix} X(j\omega) \\ \theta(j\omega) \end{Bmatrix} = \begin{Bmatrix} X^{ST} \\ 0 \end{Bmatrix} \tag{23}$$

where the following substitutions are also made $$X^{ST} = F/k$$

$$\gamma = \omega/\omega_b \tag{24}$$

The transfer function between the blade mass displacement and the forcing function (in non-dimensional form) is $$\frac{X}{X^{ST}} = \frac{\gamma^2(h^2-1) + j2\zeta_p\gamma}{[\gamma^2(h^2-1) + j2\zeta_p\gamma][1-(1+\beta)\gamma^2 + j2\zeta_b\gamma] - \beta\gamma^4} \tag{25}$$

The effects of the absorber can not be determined as clearly as with equation (4). Comparison can be made to the response of the baseline system (i.e., no absorber), whose transfer function is $$\frac{X}{X^{ST}} = \frac{1}{1-\gamma^2 + j2\zeta_b\gamma} \tag{26}$$

Figure 7:
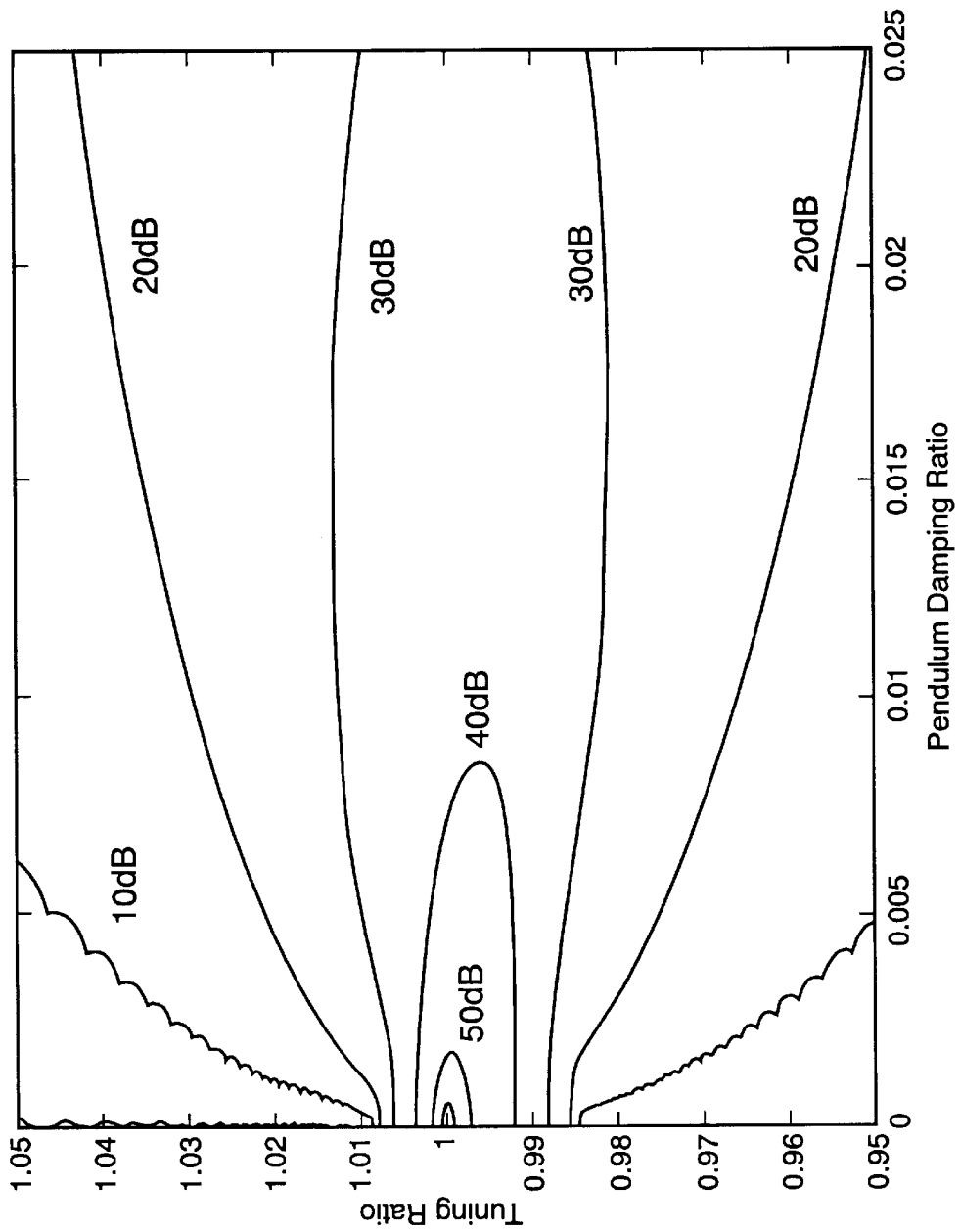

There are various measures to quantify the effects of the absorber, one of which is shown in FIG. 7. Here the reduction in peak response for various tuning ratios and pendulum damping ratios (for $\beta=0.01$ and $\zeta_b=0.25\%$) is plotted. The data is plotted in decibels of reduction which are defined by $$\text{Decibels} = 20\log_{10}\frac{\text{Peak amplitude of the baseline system}}{\text{Peak amplitude with the absorber applied}} \tag{8}$$

Notice that for an undamped absorber ($\zeta_p=0$), small amounts of mistuning severely degrade the absorber performance. It is primarily for this reason that some amount of absorber damping is necessary.

Those with skill in the art of the invention will see a variety of mechanisms for achieving pendulum damping. Some aerodynamic damping may already exist inside a hollow blade. Also, friction between the pendulum pin and a blade's internal structure may provide sufficient damping. As discussed, damping provides a more robust absorber, but it also attenuates the response of the absorber itself. Damping will also ameliorate some of the wear due to oscillation. Wear will eventually detune the absorber and possibly result in failure of the pendulum. If the failure frees the pendulum from its axis of rotation, a rotating imbalance may cause even greater problems.

A limitation of the present invention is that a single absorber can track only one speed line. For a given operating range of an engine, there may be many speed lines that excite the blade. For each of these speed lines, an absorber may be necessary.

The disclosed system for dynamically absorbing resonant vibration in jet engine blades successfully demonstrates the advantages of using a distributed pendulum mounted inside an engine blade. Although the disclosed invention is specialized, its teachings will find application in other areas where solutions to problems in other art areas can be profitably modified to solve similar problems in art areas of present interest.

Those with skill in the art of the invention will see that the pendulum can be shaped not only for a particularly desired mass distribution about its axis of motion, but also to accommodate placement inside an engine blade. For example, the pendulum could be triangular. As long as the moments of inertia of the pendulum about its axis of rotation are designed to track a particular speed line, the particular shape of the pendulum does not matter.

Those with skill in the art of the invention will also see that selection of a mounting location for the distributed pendulum and for its mounting pin can be used to satisfy other requirements as well as for tuning the pendulum to track a particular speed line. An example is that some mounting positions will be able to better damp certain vibration modes.

It is understood that modifications to the invention may be made, as might occur to one with skill in the field of this invention, within the scope of the appended claims. Therefore, all embodiments contemplated have not been shown in complete detail. Other embodiments may be developed without departing from the spirit of this invention of from the scope of the appended claims.

We claim:

1. A method for dynamically absorbing resonant vibration of a rotating component of a turbomachine over a range of turbomachine rotation rates, comprising the steps of:
    (a) providing a distributed pendulum for attaching to the rotating component inside the rotating component, the distributed pendulum having a mass distributed about an axis of motion; and,
    (b) preselecting the mass distribution of the distributed pendulum such that the natural frequency of the distributed pendulum, when attached inside the rotating component, will track a preselected speed line of the turbomachine.

2. A method for dynamically absorbing resonant vibration of a rotating component of a turbomachine over a range of turbomachine rotation rates, comprising the steps of:
    (a) providing a distributed pendulum for attaching to the rotating component inside the rotating component, the distributed pendulum having a mass distributed about an axis of motion; and,
    (b) preselecting the mass distribution of the distributed pendulum such that the natural frequency of the distributed pendulum, when attached inside the rotating component, will track a preselected speed line of the turbomachine; and,
    (c) attaching the distributed pendulum to the inside of the rotating component.

3. The method for dynamically absorbing resonant vibration of a rotating component of a turbomachine over a range of turbomachine rotation rates according to claim 1, wherein the distributed pendulum is a plate having an area distribution about the axis of motion and wherein step (b) is characterized as preselecting the area distribution of the distributed pendulum such that the natural frequency of the distributed pendulum, when attached inside the rotating component, will track a preselected speed line of the turbomachine.

4. The method for dynamically absorbing resonant vibration of a rotating component of a turbomachine over a range of turbomachine rotation rates according to claim 1, wherein the distributed pendulum is a plate having first and second moments of area and wherein step (b) is characterized as preselecting the ratio of the first and second moments of area of the distributed pendulum such that the natural frequency of the distributed pendulum, when attached inside the rotating component, will track a preselected speed line of the turbomachine.

5. The method for dynamically absorbing resonant vibration of a rotating component of a turbomachine over a range of turbomachine rotation rates according to claim 1, wherein the distributed pendulum has a shape and wherein step (b) is characterized as preselecting the shape of the distributed pendulum such that the natural frequency of the distributed pendulum, when attached inside the rotating component, will track a preselected speed line of the turbomachine.

6. The method for dynamically absorbing resonant vibration of a rotating component of a turbomachine over a range of turbomachine rotation rates according to claim 1, wherein the distributed pendulum has a varying thickness distribution and wherein step (b) is characterized as preselecting the thickness distribution of the distributed pendulum such that the natural frequency of the distributed pendulum, when attached inside the rotating component, will track a preselected speed line of the turbomachine.

7. The method for dynamically absorbing resonant vibration of a rotating component of a turbomachine over a range of turbomachine rotation rates according to claim 1, further comprising the step of providing damping for the distributed pendulum.

8. A centrifugal pendulum absorber for dynamically absorbing resonant vibration of a rotating component of a turbomachine over a range of turbomachine rotation rates, comprising a distributed pendulum attached to the rotating component inside the rotating component, the distributed pendulum having a mass distributed about an axis of motion, wherein the mass distribution of the distributed pendulum is such that the natural frequency of the distributed pendulum will track a preselected speed line of the turbomachine.

9. The centrifugal pendulum absorber for dynamically absorbing resonant vibration of a rotating component of a turbomachine according to claim 8, wherein the distributed pendulum is a plate having an area distribution about the axis of motion and wherein the area distribution of the distributed pendulum is such that the natural frequency of the distributed pendulum will track a preselected speed line of the turbomachine.

10. The centrifugal pendulum absorber for dynamically absorbing resonant vibration of a rotating component of a turbomachine according to claim 8, wherein the distributed pendulum is a plate having first and second moments of area and wherein the ratio of the first and second moments of area is such that the natural frequency of the distributed pendulum will track a preselected speed line of the turbomachine.

11. The centrifugal pendulum absorber for dynamically absorbing resonant vibration of a rotating component of a turbomachine according to claim 8, wherein the distributed pendulum has a shape such that the natural frequency of the distributed pendulum will track a preselected speed line of the turbomachine.

12. The centrifugal pendulum absorber for dynamically absorbing resonant vibration of a rotating component of a turbomachine according to claim 8, wherein the distributed pendulum has a varying thickness distribution such that the natural frequency of the distributed pendulum will track a preselected speed line of the turbomachine.

13. The centrifugal pendulum absorber for dynamically absorbing resonant vibration of a rotating component of a turbomachine according to claim 8, further comprising damping on the distributed pendulum.

* * * * *